C. W. HOTTMANN.
CUTTING MACHINE.
APPLICATION FILED FEB. 13, 1922.
1,416,204.
Patented May 16, 1922.
2 SHEETS—SHEET 2.
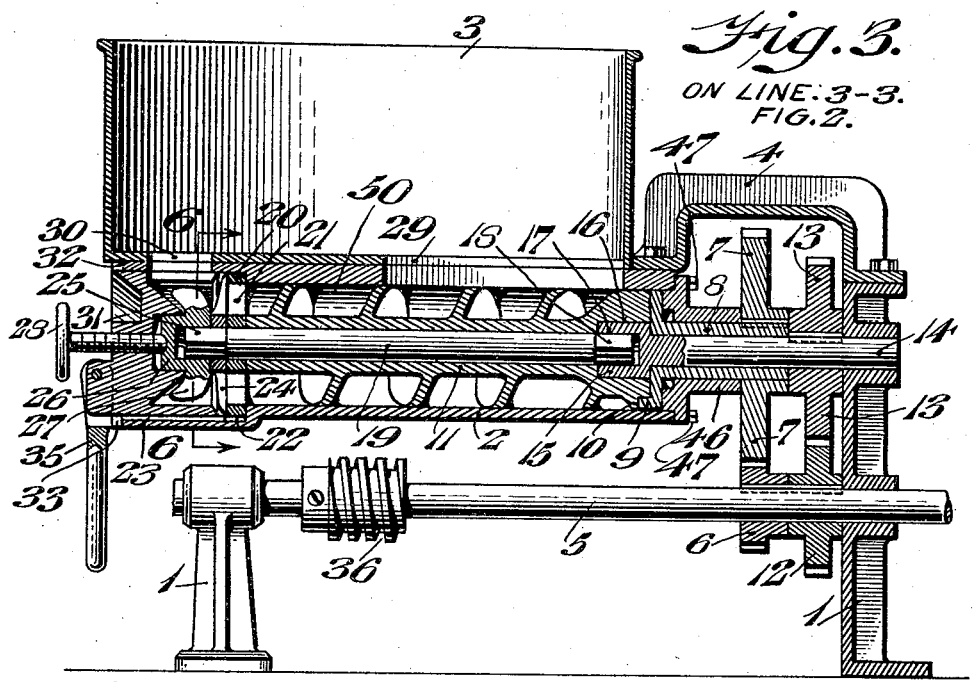
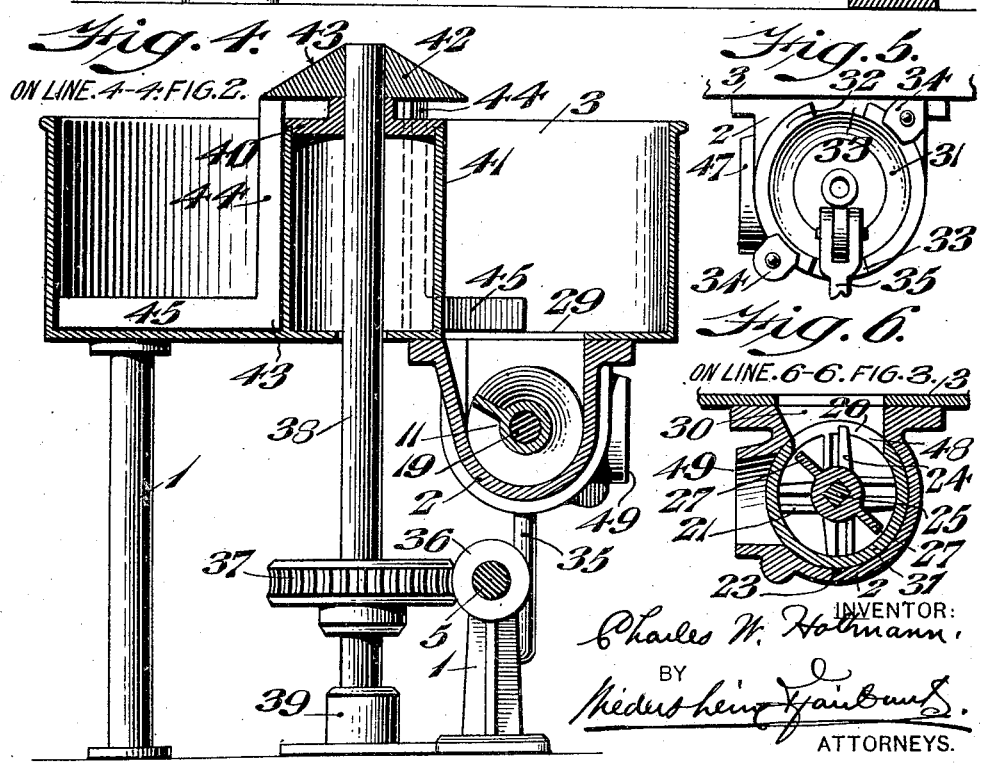
INVENTOR:
Charles W. Hottmann.
BY
ATTORNEYS.

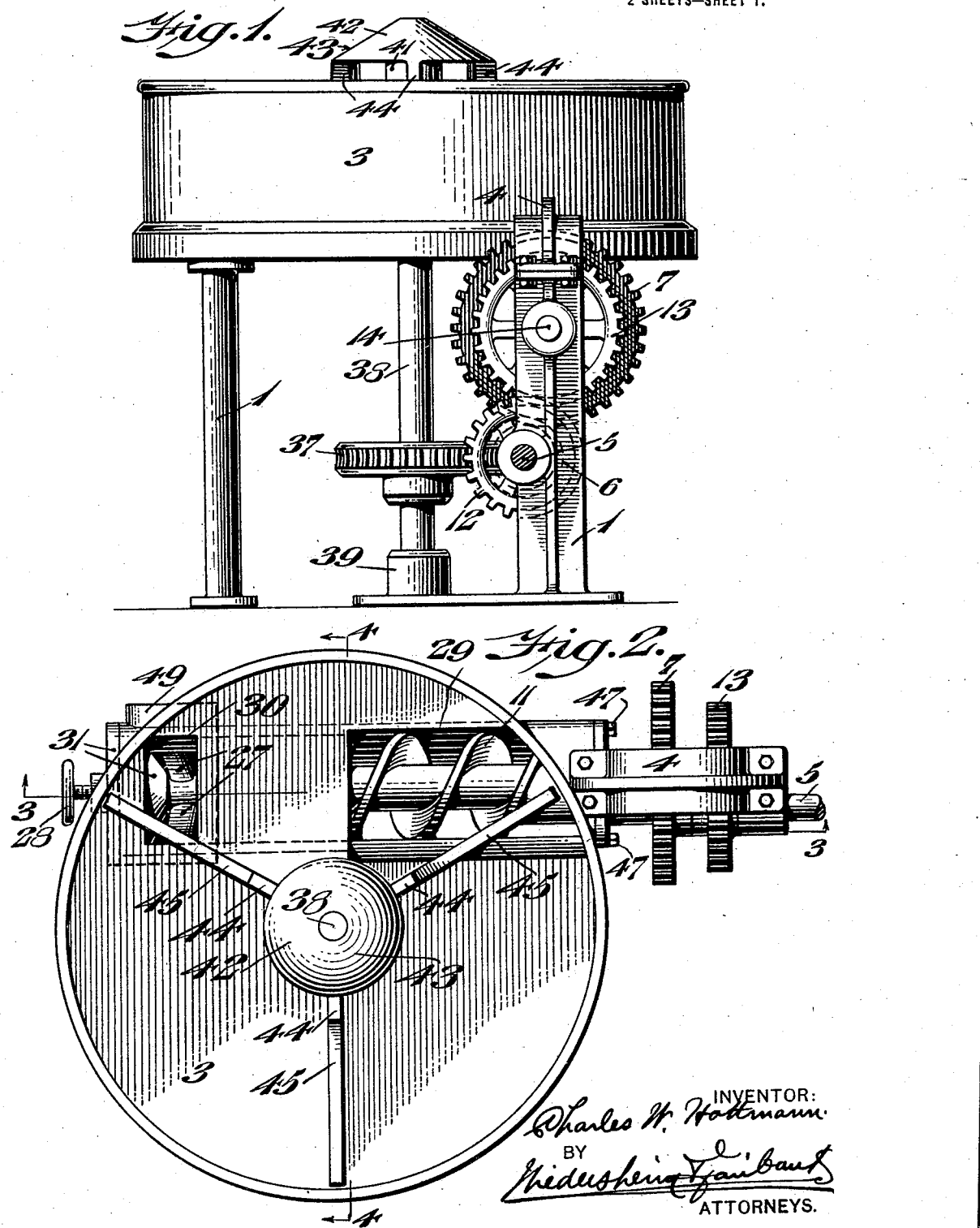

UNITED STATES PATENT OFFICE.

CHARLES W. HOTTMANN, OF PHILADELPHIA, PENNSYLVANIA.

CUTTING MACHINE.

1,416,204.

Specification of Letters Patent.  Patented May 16, 1922.

Application filed February 13, 1922. Serial No. 536,057.

*To all whom it may concern:*

Be it known that I, CHARLES W. HOTTMANN, a citizen of the United States, residing at Philadelphia, county of Philadelphia, State of Pennsylvania, have invented a new and useful Cutting Machine, of which the following is a specification.

My present invention comprehends a novel construction and arrangement of a cutting machine wherein the material can be cut to any desired degree of fineness and automatically discharged from the machine.

It further comprehends a novel construction of a casing, novel material circulating mechanism, novel cutting mechanism and novel valve mechanism.

Other novel features of construction and advantage will hereinafter more clearly appear from the detailed description and the appended claims.

For the purpose of illustrating my invention, I have shown in the accompanying drawing a typical embodiment thereof which is at present preferred by me, since this embodiment will be found in practice to give satisfactory and reliable results. It is, however, to be understood that the various instrumentalities of which my invention consists can be variously arranged and organized and that my invention is not limited to the precise arrangement and organization of these instrumentalities as herein shown and described.

Figure 1 represents, in elevation, a cutting machine, embodying my invention.

Figure 2 represents a top plan view of the cutting machine.

Figure 3 represents a section on line 3—3 of Figure 2.

Figure 4 represents a section on line 4—4 of Figure 2.

Figure 5 represents an end elevation of a portion of the machine.

Figure 6 represents a section on line 6—6 of Figure 3.

Similar numerals of reference indicate corresponding parts.

Referring to the drawings, 1 designates the standards or supporting framework of a cutting machine embodying my invention. The standards 1 support a conveyor and cutter casing 2 above which is located the casing 3 which is open at its top to receive the material to be cut. 4 designates a supporting bracket. 5 designates the main driving shaft which may be driven by any desired source of power and in practice an electric motor is preferably employed. The shaft 5 has fixed to it a gear 6 which meshes with a gear 7 fixed to a sleeve 8 having at its forward end a recessed head provided with one or more projections or tongues 9 which fit into the recesses 10 at the rear end of a hollow feed conveyor 11 having a helical blade to effect the forward feed of the material.

The main driving shaft 5 has also fixed to it a gear 12 which meshes with a gear 13 fixed to the driven shaft 14 journalled in one of the standards 1 and in the sleeve 8 through which latter it extends. This shaft 14 has at its forward end an enlarged head 15 which revolves within the recess 16 at the rear end of the feed conveyor 11. The head 15 has a polygonally shaped recess opening through its forward end adapted to receive the polygonally shaped end 18 of the cutter shaft 19 so that the shafts 14 and 19 will revolve in unison.

20 designates a disc having a hub through which the shaft 19 passes and provided with apertures 21 through which the material passes. The disc 20 is provided with a key 22 which engages the keyway 23 so that such disc 20 is prevented from rotation. 24 designates the cutting member having a plurality of cutting blades radiating from a hub which is provided with a polygonal shaped aperture to engage the polygonally shaped end 25 of the cutter shaft 19.

26 designates a feed member having one or more blades 27 and the hub of this feed member is provided with a polygonally shaped aperture into which extends the polygonally shaped end 25 of the cutter shaft 19.

28 designates a manually actuated screw which engages the feed member to retain such feed member and the cutter in assembled position. The casing 3 is provided near its bottom and on one side of the central portion of the casing with a discharge port 29 and with an inlet port 30 each of which communicates with the chamber of the conveyor casing 2. 31 designates a valve rotatably mounted in the outer end of the casing 2 and having a flange 32 which is cut away, as at 33, in order that it may be assembled with respect to the overhanging plates 34 which prevent relative outward movement of the valve with respect to the casing 2. The valve 31 is centrally recessed to receive the hub of the feed member, see Figure 3, and the screw 28 is carried by the valve 31. The valve 31 has pivoted to it an actuating handle 35.

Referring now more particularly to Figures 3 and 4, the main driving shaft 5 has fixed to it a worm 36 which meshes with a worm gear 37 fixed to a shaft 38 journalled in a bearing 39 and also in a bearing block 40 mounted in the upper end of the central tubular portion 41 of the casing 3.

The shaft 38 at its upper end carries a feed member 42 the head of which tapers downwardly, as indicated at 43, and from such head portion depends the arms 44 which contact with the outer wall of the tubular portion 41 and terminate in lateral extensions 45 which contact with the bottom of the casing 3. Any desired number of these agitators or feed members may be employed. The sleeve 8 is journalled in a bearing 46 secured to the casings 2 and 3 respectively by means of the fastening devices 47. The valve 31 is provided with an inwardly extending circular flange which is cut away, as indicated at 48, and the casing 2 is provided with a delivery spout 49, see more particularly Figure 6.

The operation of my novel cutting mechanism will now be apparent to those skilled in this art and is as follows:—

Assuming that the main driving shaft is revolving, it will be seen that its gear 12 meshes with the gear 13 thereby driving the shaft 14 and the cutter shaft 19 to which it is connected. This causes the cutter 24 to revolve and also the feed blades 27. At the same time the gear 6 meshes with the gear 7 to cause the sleeve 8 to revolve and thereby the conveyor 11. At the same time the worm 36 will effect the revolution of the feed members 44 and 45. Assuming now that the material to be treated has been placed in the casing 3, the circulation within the casing 3 is effected by means of the feed members 44 and 45 and the material will be drawn down through the discharge port 29 into the chamber in which is revolving the conveyor 11. Owing to the provision of the closed portion 50 the material will be fed under pressure through the ports 21 and the cutter 24 will cut the material with a shear cut. The rotation of the feed blades 27 causes the material to be forced upwardly through the port 30 into the chamber of the casing 3 and this action continues until the material has been cut to the desired degree of fineness. The circulation of the material in the casing 3 is effected by the feed members 44 and 45, as is evident.

When it is desired to discharge the cut material from the casing, the valve 31 is turned to bring its port 48 into register with the port 49 whereupon the material will be fed from the conveyor casing through the discharge port 49 to a desired point of utilization. For example, if the material is of a character which is to be placed in casings, the discharge port 49 would communicate directly with any desired type of stuffer. The feed conveyor 11 is driven at a lower speed than the cutting mechanism and by using gears of a different relation from the gears 6 and 7 seen in Figure 3, the cutter 24 may be revolved at any desired speed. Whenever desired, the cutting and conveying mechanism can be readily removed, for example, when it is desired to clean such parts, by revolving the valve 31 to bring the recesses in the flange 32 into register with the members 34, see Figure 5, whereupon such valve can be withdrawn. The feed member is then withdrawn, and the cutter 24, and thereafter the shaft 19. The disc 20 is then removed and the conveyor 11 withdrawn, so that the casing 3 and the feed conveyor casing 2 can be readily cleansed by steam or hot water.

It will now be apparent that I have devised a new and useful cutting machine which embodies the features of advantage enumerated as desirable in the statement of the invention and the above description, and while I have, in the present instance, shown and described an embodiment thereof which is at present preferred by me and will give in practice satisfactory and reliable results, it is to be understood that such embodiment is susceptible of modification in various particulars without departing from the spirit or scope of the invention or sacrificing any of its advantages.

Having thus described my invention, what I claim as new and desire to secure by Letters Patent, is:

1. In a cutting machine, a casing having in its bottom an inlet port and a discharge port, a feed casing beneath said bottom communicating with said port, a conveyor in said feed casing, actuating means for said conveyor, and cutting mechanism at the end of said conveyor and in proximity to said inlet port.

2. In a cutting machine, a casing having in its bottom an inlet port and a discharge port, a feed casing communicating with said port, a conveyor in said feed casing, actuating means for said conveyor, a shaft journalled in said conveyor and extending therethrough, cutting mechanism at the end of said shaft, and means to actuate said shaft.

3. In a cutting machine, a casing having in its bottom an inlet port and a discharge port, said casing having its central portion upwardly deflected, a bearing in proximity to said upwardly deflected portion, a shaft journalled in said bearing, a feed member mounted on said shaft to effect the circulation of material in said casing, a conveyor to effect the passage of material from said discharge port to said inlet port, means to actuate said shaft and said conveyor, and cutting mechanism disposed between the inlet port and said conveyor.

4. In a cutting machine, a casing having an inlet port and a discharge port in its bottom on one side of its center, a feed casing communicating with said ports, a conveyor in said feed casing, means to actuate said conveyor, a stationary disc at the end of said conveyor having ports therethrough, a cutter in proximity to said disc, and actuating means for said cutter.

5. In a cutting machine, a casing having an inlet port and a discharge port in its bottom on one side of its center, a feed casing communicating with said ports, a conveyor in said feed casing, means to actuate said conveyor, a stationary disc at the end of said conveyor having ports therethrough, a cutter in proximity to said disc, a feed member in proximity to said cutter to feed the material to said inlet port, and actuating means for said conveyor, cutter and feed member.

6. In a cutting machine, a casing having an inlet port and a discharge port, a conveyor casing communicating with said ports, a conveyor in said feed casing, a shaft mounted in said conveyor, a disc at the end of said conveyor having ports therethrough, a cutter on said shaft, a feed member on said shaft, means to secure said feed member and cutter in position on said shaft, and independent driving means for said shaft and said conveyor.

7. In a cutting machine, a casing having an inlet port and a discharge port, a feed casing communicating with said port and having a discharge port, a valve rotatably mounted at the outer end of said feed casing and forming a closure therefor, and provided with a port to register with said inlet port or with said feed casing discharge port, means to secure said valve in its adjusted position, a conveyor in said feed casing, cutting mechanism at the end of said conveyor, and actuating means for said conveyor and said cutting mechanism.

8. In a cutting machine, a casing having an inlet port and a discharge port, a feed casing communicating with said port and having a discharge port, a valve rotatably mounted at the outer end of said feed casing and forming a closure therefor and provided with a port to register with said inlet port or with said feed casing discharge port, means to secure said valve in its adjusted position, a conveyor in said feed casing, cutting mechanism at the end of said conveyor, and actuating means for said conveyor and said cutting mechanism to cause the cutting mechanism to operate at a different speed from that of said conveyor.

9. In a cutting machine, a casing having an inlet port and a discharge port, a feed conveyor casing communicating with said ports, a plurality of shafts extending into said feed conveyor casing, a tubular conveyor interlocked with one of said shafts, a cutter shaft mounted in said conveyor and detachably connected with the other of said shafts, said shaft having a polygonal shaped forward end, a cutter slidably mounted on such end, a feed member having a blade and mounted on the end of said cutter shaft in proximity to the cutter, a closure for said feed conveyor casing, a disc at the end of said conveyor having ports through it, a screw engaging said feed member and carried by said valve and securing said feed member and cutter in position on said shaft, said closure being removable whereby said feed member, cutter, disc, conveyor and cutter shaft can be removed through an end of said feed conveyor casing, and means to actuate the shafts which drive the conveyor and the cutter shaft.

10. In a cutting machine, a casing having an inlet port and a discharge port, means to effect circulation of material in said casing, a feed conveyor casing communicating with said ports, a conveyor in said feed conveyor casing to feed material from the casing discharge port to the casing inlet port, cutting mechanism at one end of said conveyor in proximity to said inlet port, a valve forming a closure for one end of said feed conveyor casing and adapted to close or open said inlet port, and actuating means for said conveyor and for said cutting mechanism.

CHARLES W. HOTTMANN.

Witnesses:
H. S. FAIRBANKS,
C. D. McVAY.